June 7, 1932.  C. V. FOULDS  1,861,847
AUTOMATIC HYDRAULIC CONTROLLER
Filed July 11, 1927   2 Sheets-Sheet 1
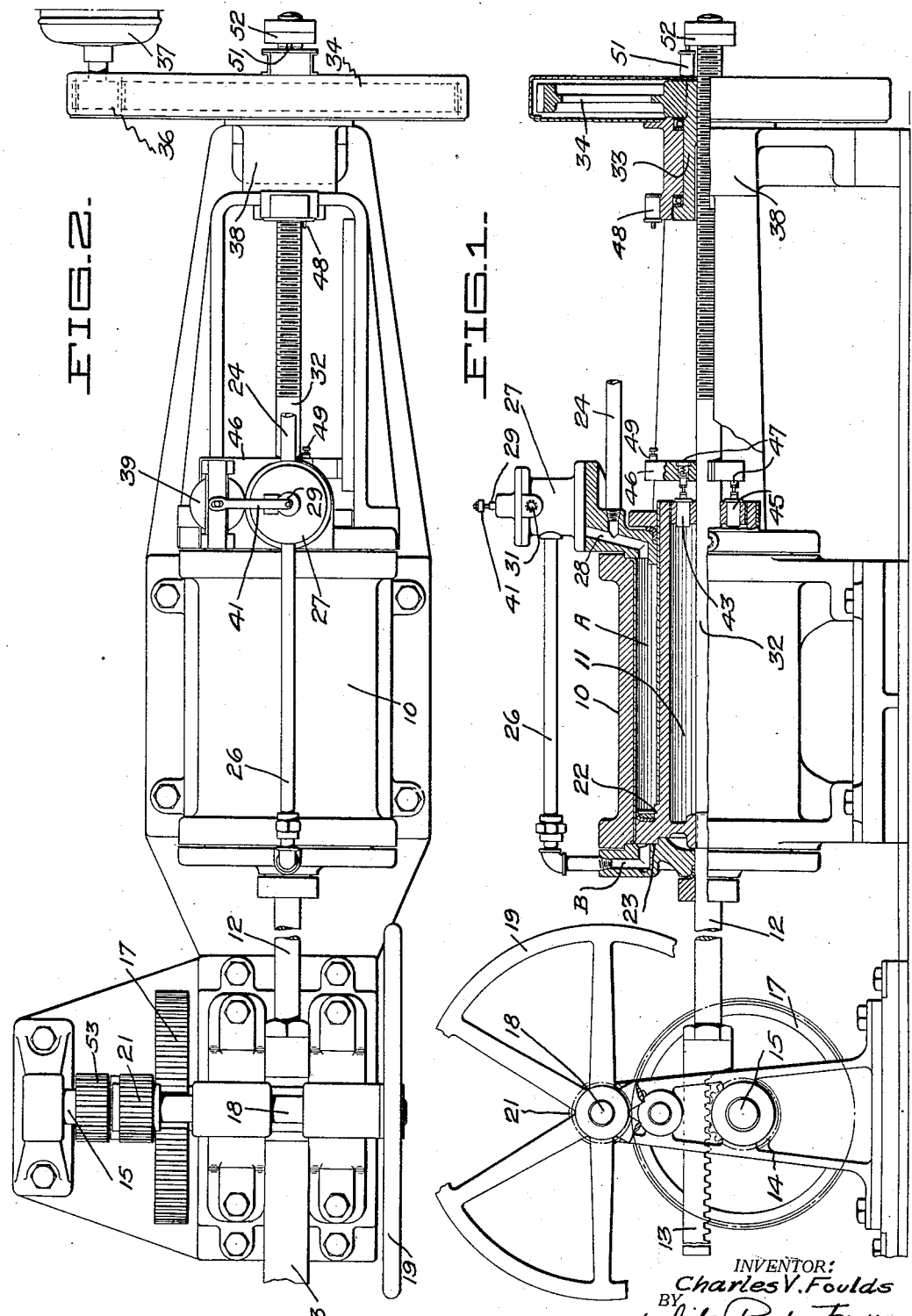

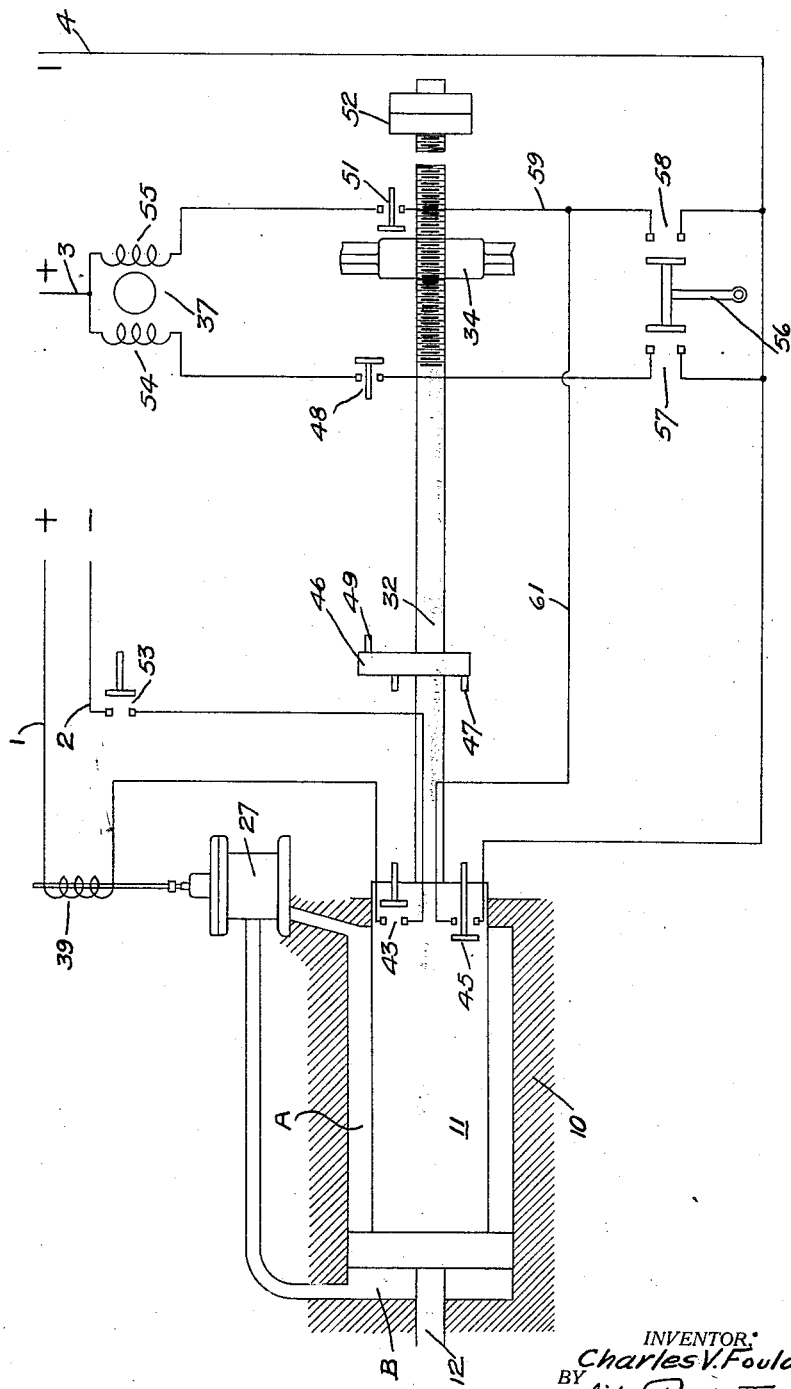

Patented June 7, 1932

1,861,847

UNITED STATES PATENT OFFICE

CHARLES V. FOULDS, OF BERKELEY, CALIFORNIA, ASSIGNOR TO THE PELTON WATER WHEEL COMPANY, OF SAN FRANCISCO, CALIFORNIA, A CORPORATION OF CALIFORNIA

AUTOMATIC HYDRAULIC CONTROLLER

Application filed July 11, 1927. Serial No. 204,903.

This invention relates generally to controlling devices for prime movers, and is particularly adapted for use with hydraulic turbines.

Hydraulic turbines are generally individually controlled by suitable governors which tend to keep the speed of the rotating part substantially constant for variations in the load or output. When a number of hydraulic turbines or other prime movers are connected to a common load, as in large interconnected alternating current distribution systems, it is customary to regulate certain of the prime movers in response to the requirements of the system as a whole or as to the amount of water or other energy available at that time, while the other prime movers are individually controlled by speed governors. For example one or more water turbines of a plurality of turbines incorporated in one system, may be controlled either automatically or by hand in response to the available supply of water. Certain turbines may also be started or stopped according to the amount of total power required by a certain distribution system. It is this type of prime mover control to which this invention relates.

It is an object of this invention to devise a controller for prime movers which will function to interrupt the supply of water or energy to the prime mover responsive to an abnormal condition, and which will also permit precise control during normal operation of the prime mover.

It is a further object of this invention to devise an improved controller for a prime mover which will make possible greater precision of control and which will be provided with convenient and safe means for restoring normal conditions after the supply of water or other energy to the prime mover has been interrupted.

It is a further object of this invention to devise a controller which will incorporate a fluid actuated piston movable to control supply of energy to a prime mover, the piston abutting a stop which may be adjusted to secure precise control.

Further objects of this invention will appear from the following description in which I have set forth the preferred embodiment of my invention. It is to be understood that the appended claims are to be accorded a range of equivalents consistent with the state of the prior art.

Referring to the drawings:

Figure 1 is a side elevational view of a controller constructed in accordance with this invention.

Fig. 2 is a plan view of the controller shown in Fig. 1.

Fig. 3 is a circuit diagram illustrating the connections for the switches and other electrical parts.

The invention as applied to hydraulic turbines, may be outlined briefly as comprising a piston movable to control the supply of water to the turbine. This piston is acted upon by fluid pressure which is controlled either manually or according to the operating conditions of the distribution system with which the turbine is associated. In case of the occurrence of an abnormal condition, fluid pressure causes the piston to move rapidly to initial or starting position, and thus shuts off the supply of water to the turbine. In its normal operating position, the piston is continuously pressed against a stop which is associated with adjusting means either controlled manually or automatically so as to effect precise control of normal operation of the turbine. This stop and its adjusting means is made sufficiently strong that it may move the piston against the forces tending to move it against the stop, without however interfering with rapid movement of the piston to initial or starting position.

Referring to the specific embodiment of the invention illustrated in the drawings there is shown a cylinder 10 within which the hydraulic piston 11 is adapted to reciprocate. Secured to the piston 11 and projecting through the end of the cylinder 10, there is a piston rod 12 which connects to suitable mechanism for controlling the supply of water or other energy to the prime mover. Assuming that movements of piston rod 12 control the power output of a hydraulic turbine, this mechanical connection may comprise a rack 13 connected to piston rod 12, the rack meshing with a pinion 14 mounted upon shaft 15. Mounted upon shaft 15 there is a pinion 53 which normally meshes with a sector associated with the means of regulating the turbine output. As an alternative means for controlling the turbine, there is shown another shaft 18 carrying hand wheel 19, pinion 21 upon shaft 18 being arranged to engage with gear 17 when shaft 18 is moved endwise in its bearing.

Piston 11 is adapted to be moved from initial starting to operating position by fluid pressure. This fluid pressure may be applied to opposite sides of the piston and controlled by an ordinary four-way valve, so that when fluid pressure is applied to one side of the piston, the fluid from the other side is exhausted to the atmosphere. For the sake of simplicity however I have shown the use of a three-way valve in conjunction with a differential type of piston. For example the face 22 of the piston is relatively smaller in exposed area compared to the other face 23, so that the piston is continuously forced toward an operating position when the same fluid pressure is present upon both sides. The chamber A upon one side of the piston is in continuous communication with a suitable source of fluid pressure applied for example through pipe 24. Upon the other side of the piston the chamber B is in communication with fluid pipe 26 which connects to a common three-way valve 27. Valve 27 likewise communicates with chamber A through passageway 28. When valve 27 is controlled by movement of its actuator 29, it may serve to place passageway 28 in communication with pipe 26 so as to apply the same pressure to both chambers A and B, with the result that piston 11 will be moved toward the right or in a direction to increase the supply of water to the turbine. The other position of valve 27 serves to exhaust the fluid in chamber B through pipe 26 and exhaust pipe 31, while passageway 28 and chamber A are still permitted to have communication with pipe 24, so that the piston can be quickly returned to initial position as shown in Fig. 1.

Movement of piston 11 in the particular case illustrated is limited by means of a stop which is adjustable to secure precise control of the turbine during normal operation. This stop has been shown as in the form of a rod 32 which extends within the piston and is adapted to abut the inner end thereof. In order to adjust the position of stop rod 32, I have shown the outer end of this rod as being threaded and provided with a rotatable nut 33. This nut is rotated by suitable means such as a gear 34 meshing with a pinion 36 provided upon the shaft of a motor 37. This motor is of course reversible and is controlled automatically or manually by an attendant. The nut 33 is suitably journaled within a bracket 38 so that its rotation serves to move stop rod 32 longitudinally with respect to the cylinder 10. The valve 27 may be controlled manually but is preferably under control of any and all devices which give an indication of abnormal or other conditions that require the water flow to the turbine to be interrupted. For example it may be electrically controlled in response to the total power output of a plurality of turbines. In the drawings I have shown electrically energized actuating means in the form of a solenoid 39 having its movable lever 41 connected to the valve actuating member 29.

The operation of the controller is as follows: In starting the turbine valve 27 is actuated either automatically or otherwise to establish communication between pipes 26 and 28. The pressure in chamber B is then substantially equal to that in chamber A, but because of the differential piston areas, piston 11 is forced hydraulically against stop 32. Stop rod 32 is then moved outwardly by control of motor 37. Piston 11 follows movement of rod 32 to increase the supply of water to the turbine until the turbine is operating normally. The stop rod 32 and its adjusting mechanism are sufficiently strong that piston 11 can be moved in opposition to the hydraulic forces, and the hydraulic forces are likewise always sufficient to keep the piston tight against the stop. The piston and likewise the turbine control mechanism will accurately follow the adjustments of stop rod 32 in accordance with control of motor 37 thus making possible precise control over normal operation of the turbine. In the event of the occurrence of abnormal operating conditons, such as overspeed or the failure of the load of a plurality of turbines operating together as one system, valve 27 is actuated to exhaust pipe 26, thus permitting the fluid pressure within chamber A to return piston 11 to its initial position, and thereby turning off the supply of water to the turbine. This return of the piston to initial or starting positon occurs relatively rapidly since its movement is independent of the adjustable stop rod 32.

As an additional feature which may be utilized if desired, I have provided means which will prevent the return of the piston to normal operation position until the stop has been moved completely to its initial position. For example I have indicated an electrical switch 43 located upon the outer end of piston 11. Fixed to the stop rod 32, there is a block 46 carrying devices 47 which are adapted to engage and operate switch 43 when the piston 11 is contacted with the end of rod 32. The switch 43 is included with an electrical circuit for solenoid 39 so that as long as piston 11 is against the end of rod 32, the circuit for solenoid 39 is in a condition to be operated to actuate valve 27 to a position to move piston 11 against stop 32. A movement of the piston to the initial position from a position of normal operation causes separation of the piston from block 46, and switch 43 thereby places the circuit for solenoid 39 in such condition that it cannot again actuate valve 27 to return piston to normal positon until the stop rod 32 has likewise been moved to a starting position by control of motor 37.

Certain cycles of operation may require the protective feature of preventing the movement of piston 11 in an opening direction until stop 32 has reached a predetermined position at or near the initial position, and for such I may make use of a second switch 45 to start motor 37 moving stop 32 towards initial position, as soon as the separation of piston and stop has occurred, this movement continuing until stopped by switch 51 at the desired point.

To prevent injury to the mechanism, switches may also be associated with the stop rod 32 to arrest the motor 37 when rod 32 is moved to either limit of its movement. For example I have shown a switch 48 mounted upon block 38 and adapted to be actuated by a device 49 provided upon the block 46. Likewise another relatively stationary switch 51 is provided which is adapted to be actuated by the adjustable locking nuts 52 which are edjustably fixed to the threaded portion of stop rod 32.

In Fig. 3 I have illustrated the manner in which the switches and other electrical parts of the system are connected. The solenoid 39 for actuating the control valve 27, is shown as energized from the current supply lines 1 and 2. The switch 43 upon the piston 11 and also a remote control switch 53, is connected in series with one of the current supply lines. When the piston 11 has been moved to a position to open the turbine valve, and the turbine is in normal running operation, both switches 43 and 53 are closed, switch 43 being closed by contact with the member 47. If an abnormal condition arises, such as an overload, overspeed or overvoltage of the turbine generator, switch 53 is caused to be opened and thus solenoid 39 deenergized to actuate valve 27 to exhaust fluid pressure from the chamber B. The motor 37 for driving the gears 34 is preferably provided with two windings 54 and 55, or an equivalent pair of magnetic switches, adapted to be separately energized for driving the motor armature in either direction. The motor takes its current from the current supply lines 3 and 4 and is under manual or automatic control by means of the switch 56. Switch 56 has been shown as being of the double throw type having one set of contacts 57 connected in series between the current supply line 4 and the motor winding 54. Limiting switch 48 is likewise inserted in series with winding 54. The other set of contacts 58 of switch 56 are connected, together with limiting switch 51, in series between motor winding 55 and the current supply line 4. The conductor 59 connecting between switches 51 and 58, is also connected to one contact of the switch 45 by means of conductor 61. The other contact of switch 45 is connected to the current supply line 4.

When the rod 32 and member 46 move sufficiently far under the power of motor 37 to bring member 46 in contact with switch 48, the energized winding 54 of motor 37 is automatically disconnected to arrest further movement. Likewise when the rod 32 is being moved toward the left by energizing winding 55 of motor 37, engagement of collar 52 with limiting switch 51 again causes deenergization of the motor. The switch 56 may be actuated in either direction to control normal output of the turbine, either manually or by other means. When the piston 11 is moved to close the turbine valve in response to opening of the control switch 53, switch 45 is immediately permitted to close and thus automatically energize motor 37 to follow up movement of the piston until collar 52 engages the limiting switch 51, while devices 47 close switch 43 to complete the circuit thru solenoid 39, and open switch 45 to permit normal operation of motor in either direction by switches 57 and 58.

I claim:

1. In a system of control for a hydraulic turbine, a piston movable to control the supply of water to the turbine, fluid means for moving said piston to a position to interrupt supply of water to the turbine in the event of abnormal operating conditions, said fluid means under normal conditions serving to constantly urge the piston in a direction to increase the supplying of water to turbine, a stop serving to limit movement of the piston in said direction, and means for adjusting the position of said stop to accommodate for normal operating conditions.

2. In a controller for a hydraulic turbine, a hydraulic piston having differential areas, said piston being movable to control the supply of water to the turbine, valve controlled fluid means for effecting movement of the piston, the normal position of the valve causing said piston to be constantly urged in a direction to increase the supply of water to the turbine, and the other position of the valve serving to move the piston in a direction to interrupt the supply of water to the turbine, a stop for limiting movement of the piston in a direction to increase the supply of water to the turbine, and means other than said valve controlled means for adjusting the position of said stop to vary the position of said normal operating piston.

3. In a controller for a hydraulic turbine, a hydraulic piston movable to increase or decrease the supplying of water to the turbine, valve controlled fluid means for effecting movement of the piston in either direction, one position of the valve causing the piston to be constantly urged in a direction to increase the supply of water to the turbine, and the other position of the valve serving to move the piston in a direction to interrupt or decrease the supply of water, a stop for limiting movement of the piston in a direction to increase the supply of water to the turbine, means for adjusting the position of said stop independently of said fluid means during normal operation of the turbine, and means for preventing return of the piston to normal operation position when it has been moved out of contact with said stop to interrupt supplying of water to the turbine.

4. In a controller for a hydraulic turbine, a hydraulic piston movable to increase or decrease the supplying of water to the turbine, valve controlled fluid means for effecting movement of the piston in either direction, one position of the valve causing the piston to be constantly urged in a direction to increase the supply of water to the turbine, and the other position of the valve serving to move the piston in a direction to interrupt or decrease the supply of water, a stop for limiting movement of the piston in a direction to increase the supply of water to the turbine, motor operated means for adjusting the position of said stop independently of said fluid means during normal operation of the turbine, and means for rendering said motive means inoperable when the stop has been moved to certain limiting positions.

5. In a controller for a hydraulic turbine, a hydraulic piston movable to increase or decrease the supplying of water to the turbine, valve controlled fluid means for effecting movement of the piston in either direction, one position of the valve causing the piston to be constantly urged in a direction to increase the supply of water to the turbine, and the other position of the valve serving to move the piston in a direction to interrupt or decrease the supply of water, a stop of limiting movement of the piston in a direction to increase the supply of water to the turbine, motor operated means for adjusting the position of said stop independently of said fluid means during normal operation of the turbine, and means for causing said stop to automatically follow the piston to initial position and restore conditions for starting.

6. In a controller for a prime mover, a member movable in one direction to increase and in another direction to decrease supplying of energy to the prime mover, means for controlling the operating position of said member including an adjustable abutment, means for effecting movement of said member in a direction to decrease the supplying of energy in the event of an abnormal operating condition, said last means operating independently of said abutment, and means for preventing return of said member to normal operating position when out of operative control of said abutment.

7. In a control system for a prime mover, means including a piston for controlling energy supplied to the prime mover, fluid means for moving said piston in a direction to interrupt supplying of energy to the prime mover in the event of abnormal operating conditions, and mechanical means in conjunction with said fluid control for varying the precise position of the piston to accommodate for normal operating conditions, said mechanical means normally abutting said piston under said normal operating conditions.

8. In a control system for a prime mover, means including a piston for controlling energy supplied to the prime mover, fluid means for moving said piston to a position which effects interruption of the supply of energy to the prime mover in the event of abnormal operating conditions, actuating means adapted to be energized to control said fluid, deenergization of said actuating means serving to effect movement of the piston to the position which interrupts the supply of energy to the prime mover, and mechanical means in conjunction with said fluid control for varying the precise position of the piston to accommodate for normal operating conditions.

9. In a control system for a prime mover, means including a piston for controlling energy supplied to the prime mover, fluid means for moving said piston to a position which effects interruption of the supply of energy to the prime mover in the event of abnormal operating conditions and electrically operated means adapted to be energized to control said fluid means, deenergization of said electrically operated means serving to effect movement of the piston to the position which interrupts the supply of energy to the prime mover.

10. In a control system for a prime mover, means including a piston for controlling energy supplied to the prime mover, fluid means for moving said piston to a position which effects interruption of the supply of energy to the prime mover in the event of abnormal operation conditions, electromagnetic means adapted to be energized to control said fluid means, deenergization of said electromagnetic means serving to effect movement of the piston to the position which interrupts the supply of energy to the prime mover.

In testimony whereof, I have hereunto set my hand.

CHARLES V. FOULDS.